United States Patent

Ida et al.

[11] Patent Number: 5,314,344
[45] Date of Patent: May 24, 1994

[54] CLOCK SPRING CONNECTOR

[75] Inventors: Yuichi Ida, Miyagi; Hironori Kato, Sendai; Kunihiko Sasaki, Miyagi; Hiroyuki Bannai, Furukawa, all of Japan

[73] Assignee: Alps Electric Co., Ltd., Tokyo, Japan

[21] Appl. No.: 987,915

[22] Filed: Dec. 7, 1992

[30] Foreign Application Priority Data

Dec. 13, 1991 [JP] Japan .................. 3-351289

[51] Int. Cl.$^5$ ............................ H01R 35/04
[52] U.S. Cl. ............................. 439/164; 439/15
[58] Field of Search ................... 439/15, 164

[56] References Cited

U.S. PATENT DOCUMENTS

| | | | |
|---|---|---|---|
| 4,451,105 | 5/1984 | Sakurai | 439/16 |
| 4,789,342 | 12/1988 | Shitanoki | 439/15 |
| 4,821,016 | 4/1989 | Zeller et al. | 439/15 |
| 4,867,688 | 9/1989 | Suzuki | 439/15 |
| 4,875,860 | 10/1989 | Suzuki | 439/15 |
| 5,046,951 | 9/1991 | Suzuki | 439/164 |
| 5,127,841 | 7/1992 | Bannai et al. | 439/164 |

Primary Examiner—Gary F. Paumen
Attorney, Agent, or Firm—Guy W. Shoup; Patrick T. Bever

[57] ABSTRACT

The invention relates to a clock spring connector which permits a reduction in the length of a flexible cable and simplification of the alignment mechanism.

The clock spring connector has a first housing, and a second housing, a flexible cable wound in opposite directions through a U-shaped reversed portion in the ring-like space defined by the outer cylindrical portion of the first housing and the inner cylindrical portion of the second housing, and a moving member rotating while following the reversed portion. A third mark as an indicator is provided on a spacer which partially forms the moving member so that the third mark can be visually observed from the outside when the second housing is at the neutral position.

13 Claims, 10 Drawing Sheets

CLOCK SPRING CONNECTOR

BACKGROUND OF THE INVENTION

1. Field of the Invention

The present invention relates to a clock spring connector applied to an automobile steering system or the like and using a flexible cable for electrical connection between a fixed member and a movable member, and particularly to an alignment mechanism for aligning the fixed member and the movable member with a neutral position.

2. Description of the Related Art

A clock spring connector includes a flexible cable used for connecting a fixed member and a movable member rotatably mounted on the fixed member, and is used as an electrical connection device of an automobile steering system or the like.

In a generally known clock spring connector of this type, a flat cable comprising a plurality of conductor wires, which are laminated with two insulating films, is loosely spirally contained in a cable holding space interposed between the fixed member and the movable member, one end of the flat cable being fixed to an outer cylindrical portion formed in one of the fixed member and the movable member, and the other end being fixed to an inner cylindrical portion formed in the other member.

When the movable member is rotated, the clock spring connector permits the flat cable contained in the cable holding space to be wound on the side of the inner cylindrical portion or rewound on the side of the outer cylindrical portion in accordance with the rotation direction of the movable member. It is thus possible to constantly hold electrical connection between the fixed member and the movable member relatively rotated, with acting substantially no tension on the flat cable within the range from the state where the flat cable is completely wound on the side of the inner cylindrical portion and the state where the flat cable is completely rewound on the side of the outer cylindrical portion.

When the clock spring connector configured as described above is incorporated into a steering system, the clock spring connector must be incorporated so that the movable member at a neutral position of a steering wheel can be rotated for the same angle in the normal and reverse directions. An alignment mechanism has been thus proposed in which an indicator gear is axially supported by the fixed member, and a projection which can engage with the gear is provided on the movable member so that the movable member and the fixed member are aligned by rotating the gear for a predetermined angle when the movable member is rotated for 360°. However, this conventional alignment mechanism has the problem that the need for disposing the gear on the outside of the outer cylindrical portion of the fixed member increases the outer diameter of the clock spring connector.

The above conventional clock spring connector employs a difference between the diameters of the outer cylindrical portion and the inner cylindrical portion for winding and rewinding the flat cable. When the rotation angle of the movable member is constant, the length of the flat cable can thus be decreased as the difference between the diameters is increased. However, since the diameter of the inner cylindrical portion is unconditionally determined by the diameter of a rotational shaft, for example, the automobile steering shaft, on which the clock spring connector is provided and since the difference between the diameters of the outer cylindrical portion and the inner cylindrical portion cannot be much increased because of the demand for decreasing the size of the system, the difference between the diameters of the outer cylindrical portion and of the inner cylindrical portion cannot be much increased. The clock spring connector generally thus requires a long flat cable which causes difficulties in the production thereof, thereby causing the problem that the total cost of the clock spring connector is increased.

SUMMARY OF THE INVENTION

The present invention has been achieved in consideration of the above situation of prior art, and an object of the present invention is to make an attempt to simplify an alignment mechanism and decrease the length and size of a flexible cable and to provide a small clock spring connector at low cost.

In order to achieve the object, the present invention provides a clock spring connector comprising a fixed member; a movable member rotatably mounted on the fixed member; a flexible cable contained in a space between an inner cylindrical portion provided on one of the fixed member and the movable member, and an outer cylindrical portion provided on the other; and a moving member disposed in the space and having an opening. The flexible cable is reversed in a U-shaped form in the opening of the moving member so as to be wound on the inner and outer housing portions in opposite directions. The moving member is provided with an indicator portion so that the indicator portion can be seen from the outside through the indicator indicating the neutral position of rotation of the movable member.

When the movable member is rotated in one direction relative to the fixed member, the reversed portion of the flexible cable is rotated for an angle smaller than the rotational angle of the movable member in the same direction, and the moving member is also rotated in the same direction while following the reversed portion. When the indicator portion provided on the moving member can be seen from the outside through the indicator, the movable member and the fixed member which are at a neutral position of rotation can visually be detected. On the other hand, when the indicator portion does not coincide with the indicator, the movable member which is deviated from the neutral position can visually be detected.

DETAILED DESCRIPTION OF THE PREFERRED EMBODIMENTS

Embodiments of the present invention are described below with reference to the drawings.

Figure 1:
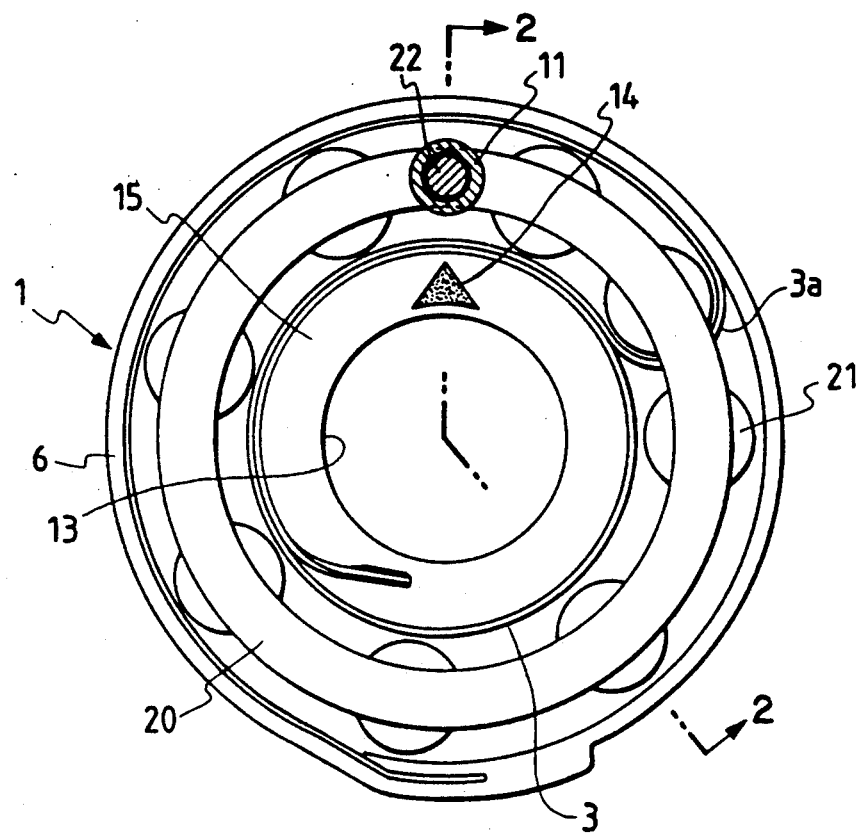
FIG. 1 is a plan view showing a clock spring connector in accordance with a first embodiment of the present invention.
Figure 2:
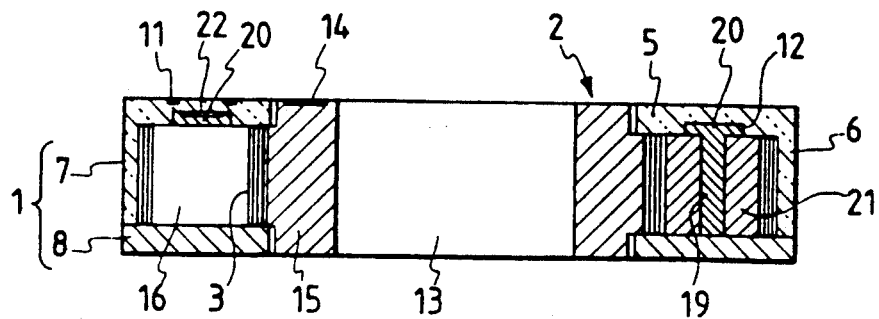
FIG. 2 is a sectional view taken along line A—A in FIG. 1.
Figure 3:
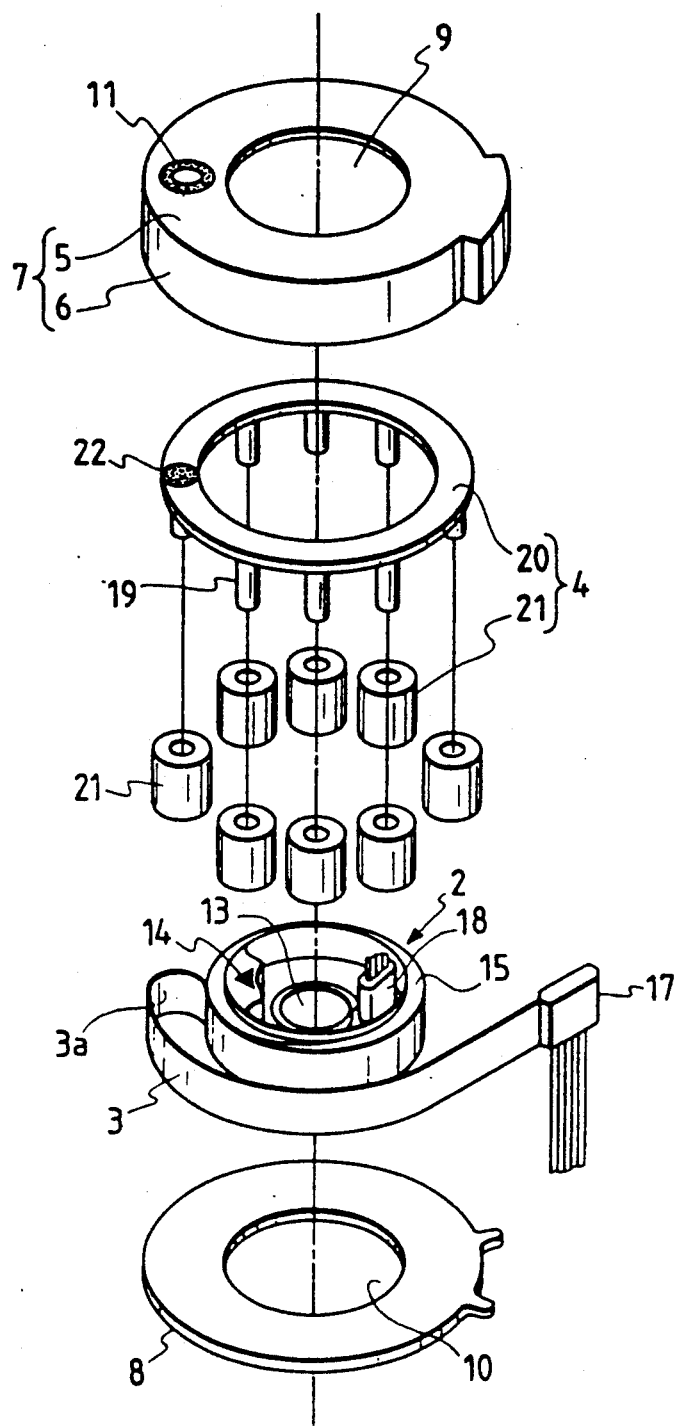
FIG. 3 is an exploded perspective view of the clock spring connector shown in FIG. 1.
Figure 4:
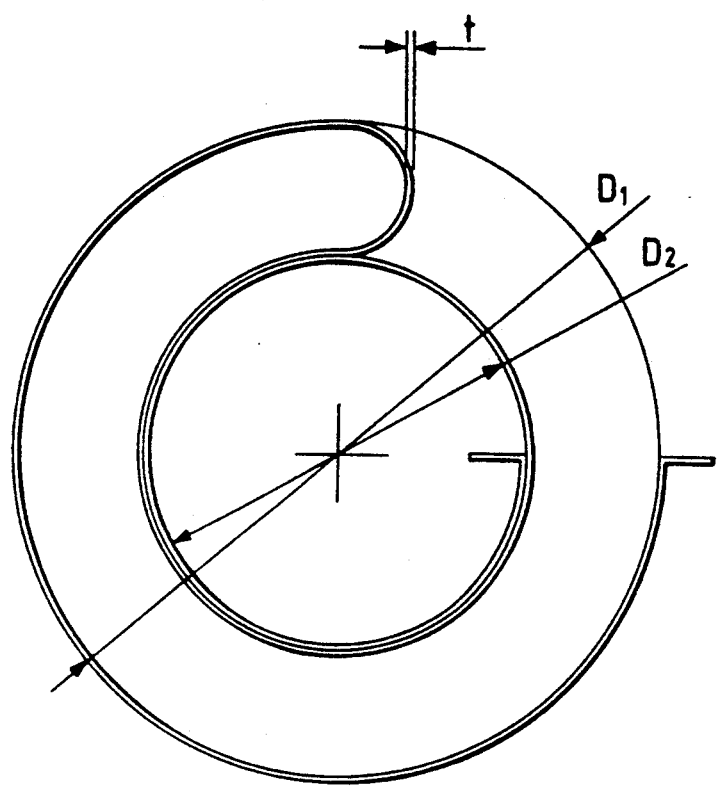
FIG. 4 is an explanatory view of a flexible cable provided in the clock spring connector shown in FIG. 1.

FIG. 1 is a plan view of a clock spring connector in accordance with a first embodiment of the present invention, FIG. 2 is a sectional view taken along line A—A in FIG. 1, FIG. 3 is an exploded perspective view of the clock spring connector, FIG. 4 is an explanatory view of a flexible cable, and FIG. 5 is an explanatory view of the operation of an alignment mechanism.

As shown in FIGS. 1 to 3, the clock spring connector in accordance with this embodiment comprises a first housing 1, a second housing 2 rotatably mounted on the first housing 1, a flexible cable 3 contained between both housings 1 and 2, and a moving member 4 rotatably disposed between both housings 1 and 2.

The first housing 1 comprises an upper case 7 having an outer cylindrical portion 6 erectly provided along the periphery of a top plate 5, and a lower cover 8 integrally joined to the lower end of the outer cylindrical portion 6. At least the upper case 7 of these portions is made of a transparent synthetic resin. The top plate 5 of the upper case 7 and the lower cover 8 have central holes 9 and 10, respectively, which are formed at the centers thereof. In addition, a first mark 11 and a ring-shaped guide groove 12 are provided on the upper and lower sides, respectively, of the top plate 5.

The second housing 2 comprises a cylindrical portion having a shaft insertion hole 13 at the center thereof, the upper and lower ends of the outer periphery thereof being guided by the central holes 9 and 10 of the upper case 7 and the lower cover 8, respectively, so that the second housing 2 is rotatably connected to the first housing 1. A second mark 14 is provided on the top surface of the second housing 2 so as to be opposite to (coincide with) the first mark 11 each time the second housing 2 is rotated for 360° relative to the first housing 1. As shown in FIG. 2, a space 16 which has a ring-like form as viewed from the top is formed by the top plate 5, the outer cylindrical portion 6 and the lower cover 8 on the side of the first housing 1 and the cylindrical portion 15 which forms the periphery on the side of the second housing 2.

The flexible cable 3 comprises a so-called flat cable having conductor wires arranged in parallel and laminated with two insulating films. In this embodiment, a flat cable for five circuits in which five conductor wires are buried is used. One end of the flexible cable 3 is connected to a first connector 17 fixed to the outer cylindrical portion 6 and is led to the outside of the first housing 1 through the first connector 17. On the other hand, the other end of the flexible cable 3 is connected to a second connector 18 fixed to the inner cylindrical portion 15 and is led to the outside of the second housing 2 through the second connector 18. The flexible cable 3 is also contained in the space 16 so as to be wound clockwise along the inner wall of the outer cylindrical portion 6 from the first connector 17, is reversed in a U-shaped form (referred to as "reversed portion 3a" hereinafter), and is then wound counterclockwise around the outer wall of the inner cylindrical portion 15 to lead to the second connector 18.

The moving member 4 comprises a ring-shaped spacer 20 having a plurality of pins 19 erectly provided on the lower surface thereof, and rollers 21 respectively, rotatably and axially supported by the pins 19. A third indicator mark 22 is provided on the top surface of the spacer 20. The moving member 4 is disposed in the space 16, the radial movement of the spacer 20 being restricted by the guide groove 12. The reversed portion 3a of the flexible cable 3 is positioned in the opening between the adjacent two rollers 21 in the group of the rollers 21.

The operation of the clock spring connector in accordance with the embodiment is described below with reference to FIGS. 4 and 5 using an example in which the first housing is used as a fixed member, and the second housing is used as a movable member. FIG. 5 schematically illustrates the movement of the moving member 4. In the drawings, a white circle shows the position where the first mark 11 coincides with the second mark 14, and a hatched circle shows the position of the third mark 22. Both housings 1 and 2 are not shown in FIG. 5.

Figure 5A:
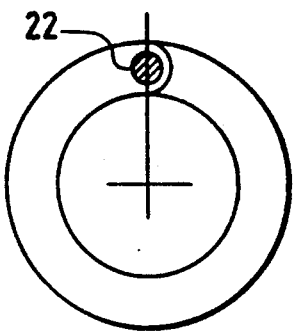
FIG. 5 is an explanatory view of the operation of an alignment mechanism provided in the clock spring connector shown in FIG. 1.

FIG. 5(a) shows the neutral position where the flexible cable 3 is wound in the same amount on the outer cylindrical portion 6 of the first housing 1 and on the inner cylindrical portion 15 of the second housing 2. In this case, the third mark 22 formed on the spacer 20 is positioned immediately above the first mark 11 which coincides with the second mark 14, and the presence of the second housing 2 at the neutral position of rotation can be visually detected by observing the third mark 22 through the upper case 7 made of a transparent resin from the outside. When the second housing 2 is rotated clockwise from the neutral position shown in FIG. 5(a), the reversed portion 3a of the flexible cable 3 is rotated clockwise for an angle smaller than the rotational angle of the second housing 2. The group of the rollers 21 and the spacer 20 are also rotated in the clockwise direction while following the reversed portion 3a. As a result, the flexible cable 3 is drawn out for a length corresponding to about twice the rotation angle from the side of the inner cylindrical portion 15, and is rewound on the side of the outer cylindrical portion 6.

As shown in FIG. 4, assuming that the inner diameter of the outer cylindrical portion 6 is $D_1$, the outer diameter of the inner cylindrical portion 15 is $D_2$, the thickness of the flexible cable 3 is t, the rewinding number of the flexible cable 3 on the outer cylindrical portion 6 is $n_1$, the winding number of the flexible cable 3 on the inner cylindrical portion 15 is $n_2$, and the rotation angle of the spacer 22 (the reversed portion 3a) when the second housing 2 makes a turn is x°, the following relation is established among these values:

$$\{(D_2+(2n_2-1))\}\pi = \{D_2+(2n_2-1)t\}\pi x/360 + \{D_1 - (2n_1-1)t\}\pi x/360$$

When the thickness of the flexible cable 3 is large, the above relation is established. However, since the thickness of the flexible cable 3 brought into practical use is as small as 1 mm or less, t=0 is substituted into the above equation to obtain the following approximate equation:

$$D_2\pi = D_2\pi x/360 + D_1\pi x/360$$

$$D_2 = (D_2+D_1)x/360$$

$$x = 360\, D_2/(D_2+D_1)$$

In this embodiment, $D_1$ and $D_2$ are set to 90 mm and 60 mm, respectively. Substituting these values into the above equation, x=144. Namely, when the second housing 2 is rotated for 360° (one turn), the spacer 20 is rotated for 144°, and when the second housing is rotated for 720° (two turns), the spacer 20 is rotated for 288°.

Figure 5B:
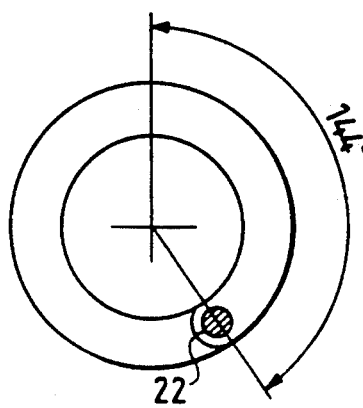
Figure 5C:
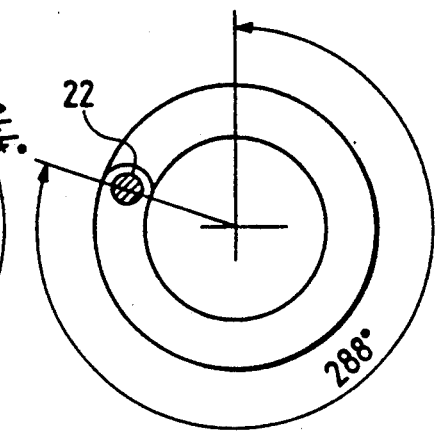

When the second housing is rotated for 360° in the clockwise direction from the neutral state shown in FIG. 5(a), although the first mark 11 coincides with the second mark 14, the third mark 22 on the spacer 20 is thus deviated from the coincident position of both marks 11 and 14 by 144°, as shown in FIG. 5(b). Similarly, when the second housing 2 is rotated for 720° in the clockwise direction from the neutral position shown in FIG. 5(a), the third mark 22 is deviated from the coincident position of the first and second marks 11 and 14 by 288°, as shown in FIG. 5(c). The deviation of the second housing 2 from the neutral position can thus be detected by visually observing the positional deviation of the third mark 22 from the first and second marks 11 and 14 from the outside through the upper case 7.

Figure 5D:
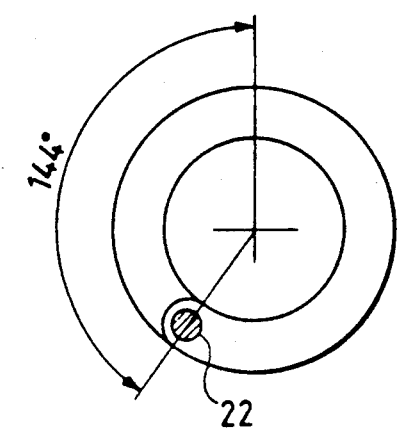
Figure 5E:
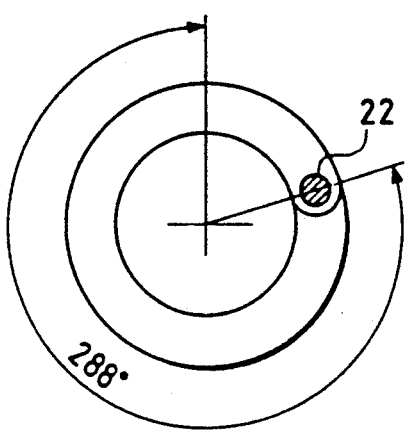

Conversely, when the second housing 2 is rotated in the counterclockwise direction from the neutral position shown in FIG. 5(a), the reversed portion 3a of the flexible cable 3 and the moving member 4 are rotated in the counterclockwise direction for an angle smaller than the rotational angle of the second housing 2. As a result, the flexible cable 3 is drawn out from the outer cylindrical portion 6 in a length corresponding to about twice the rotational angle of the reversed portion 3a and is wound on the inner cylindrical portion 15. In this case, when the second housing 2 is rotated for 360° in the counterclockwise direction from the neutral position shown in FIG. 5(a), although the first mark 11 coincides with the second mark 14, the third mark 22 on the spacer 20 is deviated from the coincident position of both marks 11 and 14 by 144°, as shown in FIG. 5(d). Similarly, when the second housing 2 is rotated for 720° in the counterclockwise direction from the neutral position shown in FIG. 5(a), the third mark 22 is deviated from the coincident position of the first and second marks 11 and 14 by 288°, as shown in FIG. 5(e). The deviation of the second housing 2 from the neutral position can thus be detected by visually observing the position of the third mark 22 from the outside through the upper case 7.

In the clock spring connector according to the first embodiment, since the flexible cable 3 is wound on the outer cylindrical portion 6 and the inner cylindrical portion 15 in the opposite directions through the reversed portion 3a, the necessary length of the flexible cable 3 can be decreased, thereby advantageously decreasing the total cost and the size.

In addition, since the moving member 4 is disposed between the portion of the flexible cable 3, which is wound on the outer cylindrical portion 6, and the portion thereof which is wound on the inner cylindrical portion 15, and since the reversed portion 3a is looped between two rollers 21 in the group of the rollers 21 provided on the moving member 4, the roller group can prevent the flexible cable 3 from being buckled due to expansion in the radial direction on the way to the reversed portion 3a during winding or rewinding of the flexible cable 3, thereby ensuring the winding or rewinding operation.

Further, since the third mark functioning as an indicator is provided on the spacer 20 attached to the moving member 4, the alignment of the first and second housings 1 and 2 can be performed by visually observing the third mark 22 from the outside through the upper case 7. Since the alignment mechanism can employ a simple arrangement comprising the third mark 22 which is provided on the spacer 20 contained in both housings 1 and 2 and which is visually observed from the outside, there is the advantage that the size of the clock spring connector can be reduced.

Further, since the first and second marks 11 and 14 indicating the neutral position are provided on the first and second housings 1 and 2, respectively, even when the definite movable range of the second housing 2 is set so that the spacer 20 can be rotated for at least 360° in the normal and reverse directions relative to the neutral position, i.e., even when, in this embodiment, the definite movable range of the second housing 2 is set to three turns or more in both the normal and reverse directions, the presence of the second housing 2 at the neutral position can be detected by visually observing the state where all the first to third marks 11, 14 and 22 coincide with each other. When the movable range of the spacer 20 is set to less than one turn in the normal and reverse directions, the second mark 14 of the second housing 2 can be omitted.

Figure 6:
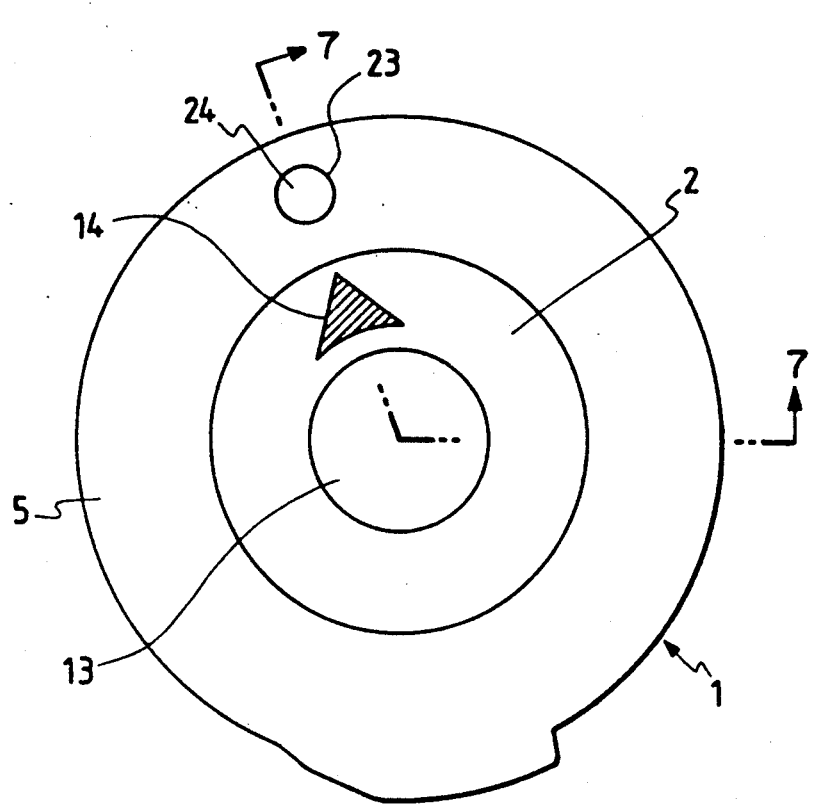
FIG. 6 is a plan view of a clock spring connector in accordance with a second embodiment of the present invention.
Figure 7:
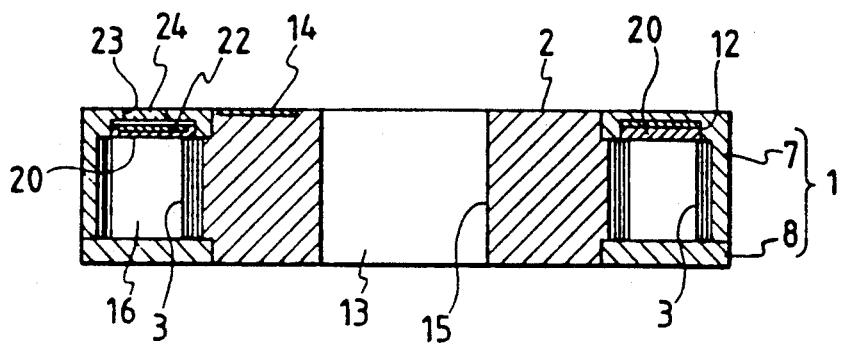
FIG. 7 is a sectional view along line B—B in FIG. 6.
Figure 8:
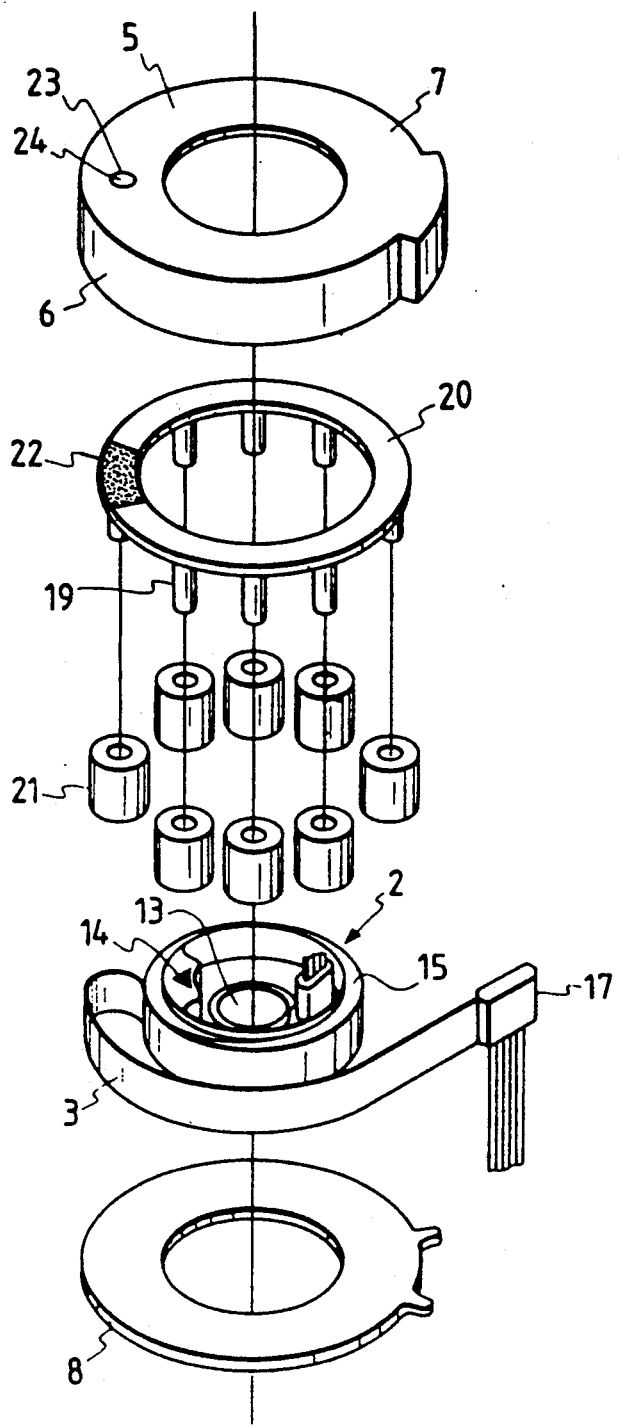
FIG. 8 is an exploded perspective view of the clock spring connector shown in FIG. 6.

FIG. 6 is a plan view of a clock spring connector in accordance with a second embodiment of the present invention, FIG. 7 is a sectional view taken along line B—B in FIG. 6, and FIG. 8 is an exploded perspective view of the clock spring connector. In the drawings, portions corresponding to those shown in FIGS. 1 to 3 are denoted by the same reference numerals.

The second embodiment is different from the first embodiment in the point that the upper case 7 which constitutes a portion of the first housing 1 is made of inexpensive opaque resin, and that a through hole 23 formed in the top plate 5 of the upper case 7 and a transparent material 24 for filling up the through hole 23 are provided with the same indicator function as that of the first mark. The other portions are the basically the same as those in the first embodiment. In the second embodiment, the third mark 22 on the spacer 20 can be visually observed from the outside through the transparent material 24 only when the third mark 22 is at a position opposite to the through hole 23. In other words, when the movable range of the spacer 20 is set to less than one turn from the neutral position in the normal and reverse directions, the neutral position is a position where the third mark 22 can be observed through the transparent material 24. When the movable range of the spacer 20 is set to one turn or more in the normal and reverse directions, the neutral position is a position where the second mark 14 of the second housing 2 coincides with the through hole 23, and where the third mark 22 can be visually observed through the transparent material 24.

Figure 9:
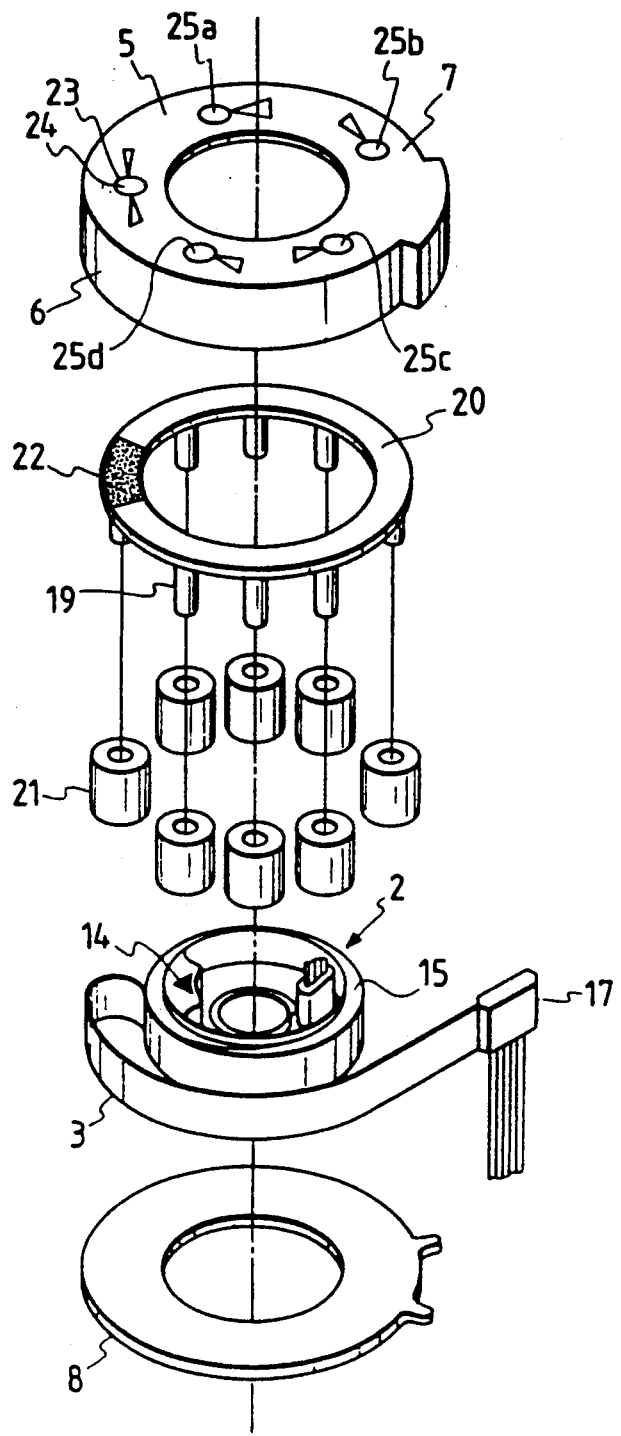
FIG. 9 is an exploded perspective view of a clock spring connector in accordance with a third embodiment.

FIG. 9 is an exploded perspective view of a clock spring connector in accordance with a third embodiment of the present invention, and FIG. 10 is an explanatory view of the operation of the clock spring connector. In the drawings, portions corresponding to those shown in FIGS. 6 to 8 are denoted by the same reference numerals.

Figure 10A:
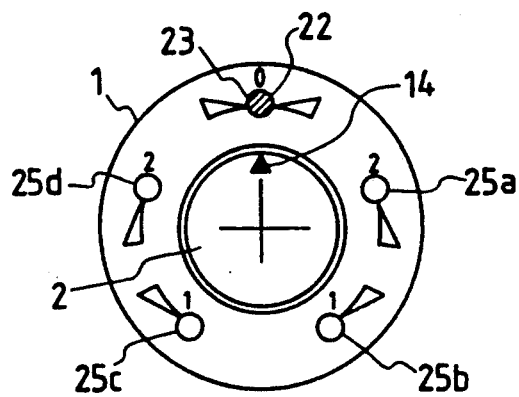
FIG. 10 is an explanatory view of the operation of an alignment mechanism provided in the clock spring connector shown in FIG. 9.
Figure 10B:
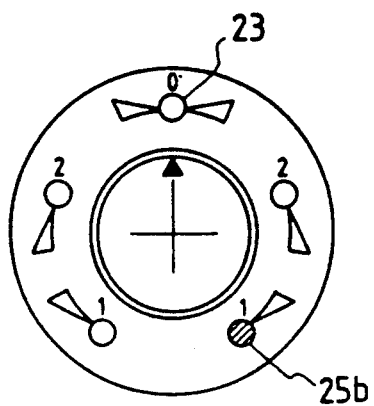
Figure 10C:
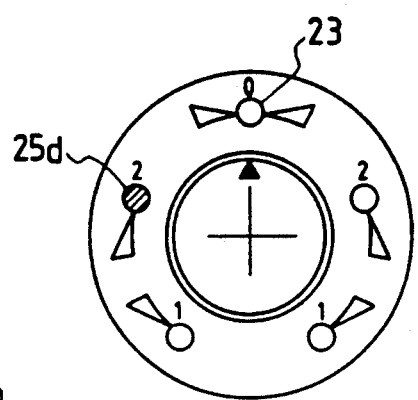
Figure 10D:
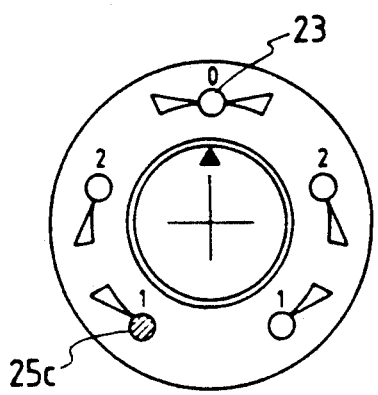
Figure 10E:
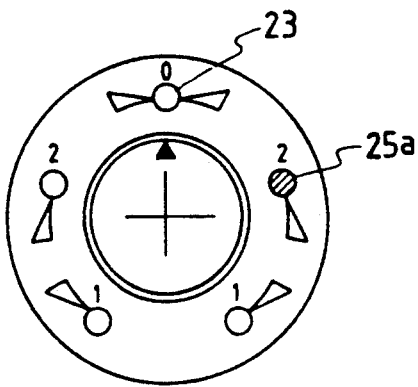

The third embodiment is different from the second embodiment in the point that the top plate 5 of the upper case 7 is provided with windows 25a to 25d each comprising the through hole 23 and the transparent material 24. The other portions are basically the same as those in the second embodiment. In the third embodiment, when the second housing 2 is at the neutral position, the third mark 22 on the spacer 20 can be visually observed from the outside through the transparent material 24 which coincides with the second mark 14, as shown in FIG. 10(a). When the second housing is deviated in the clockwise direction from the neutral position by one turn and two turns, the third mark 22 can be visually observed from the outside through the windows 25b and 25d, respectively, as shown in FIGS. 10(b) and 10(c). When the second housing is deviated in the counterclockwise direction from the neutral position by one turn and two turns, the third mark 22 can be visually observed from the outside through the windows 25d and 25e, respectively, as shown in FIGS. 10(d) and 10(e). It is thus possible to instantaneously know that the second housing 2 is at the neutral position and know by each of the windows 25a to 25e the direction of deviation of the second housing 2, the normal direction or the reverse direction, even when the second housing 2 is not at the neutral state. The alignment operation is thus simplified. In this embodiment, when the movable range of the spacer 20 is set to less than one turn in the normal and reverse directions, the second mark 14 on the second housing 2 need not to be provided.

Figure 11:
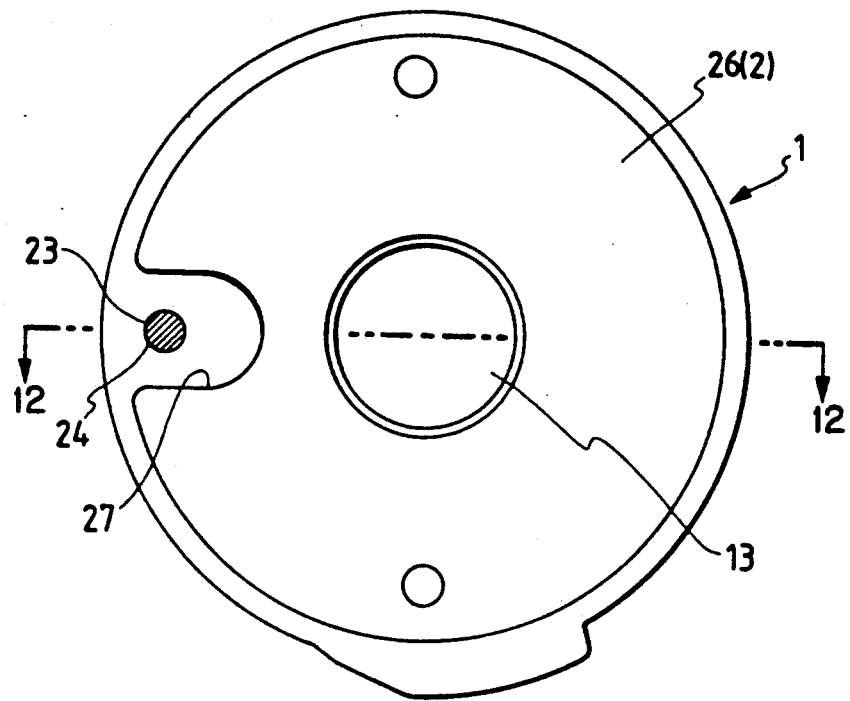
FIG. 11 is a plan view of a clock spring connector in accordance with a fourth embodiment of the present invention.
Figure 12:
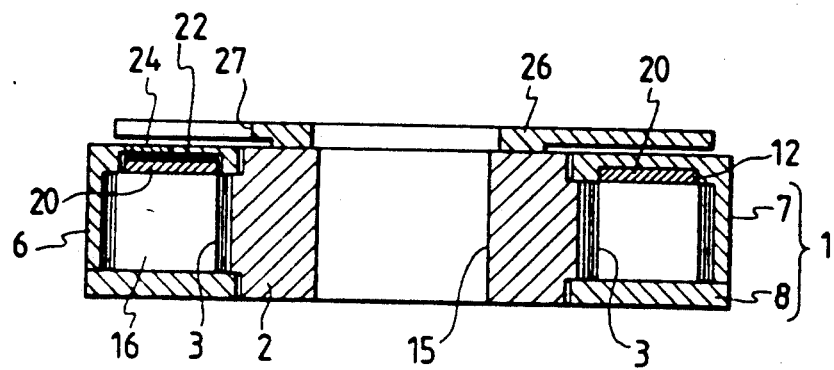
FIG. 12 is a sectional view taken along line C—C in FIG. 11.

FIG. 11 is plan view of a clock spring connector in accordance with a fourth embodiment of the present invention, and FIG. 12 is a sectional view taken along line C—C in FIG. 11. The fourth embodiment is basically the same as the third embodiment shown in FIGS. 6 to 8 with the exception that a plate member 26 is provided on the upper side of the second housing 2.

The plate member 26 is formed integrally with the second housing 2 so as to cover the top plate 5 of the upper case 7 and has a notch 27 formed in the periphery thereof. The notch 27 is positioned immediately above the through hole 23 (first mark) of the first housing 1 when both housings 1 and 2 are in the neutral state. In other states, the through hole 23 is covered with the plate member 27. The notch 27 thus has the same function as that of the second mark 14, and the third mark 22 on the spacer 20 can be visually observed from the outside through the transparent material in the through hole 23 and the notch 27 of the plate member 26 only when the second housing 2 is in the neutral state.

Figure 13:
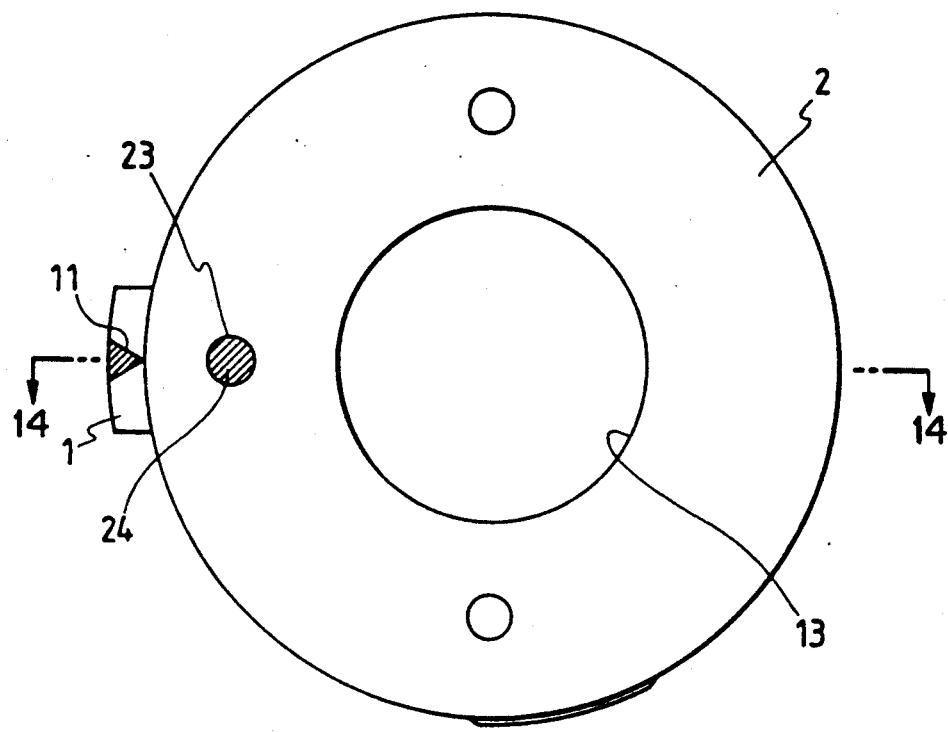
FIG. 13 is a plan view of a clock spring connector in accordance with a fifth embodiment of the present invention.
Figure 14:
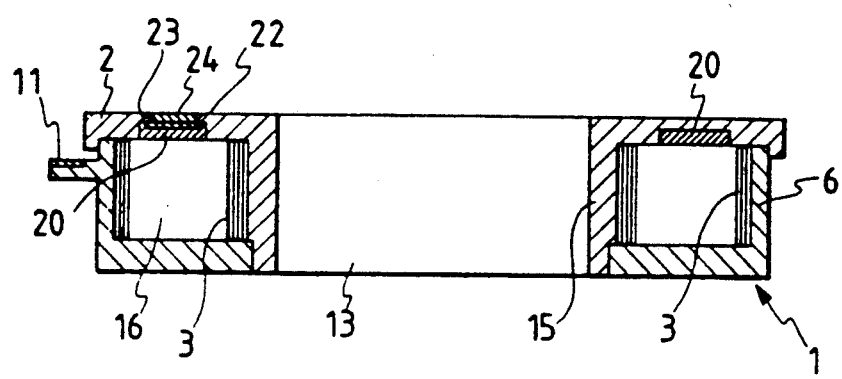
FIG. 14 is a sectional view taken along line D—D in FIG. 13.

FIG. 13 is a plan view of a clock spring connector in accordance with a fifth embodiment of the present invention, and FIG. 14 is a sectional view taken along line D—D in FIG. 13, In the drawings, portions corresponding to those in the first and fourth embodiments are denoted by the same reference numerals.

In the fifth embodiment, the first housing 1 has a bottomed cylindrical form having the outer cylindrical portion 6 in the periphery thereof, and the inner cylindrical portion 15 is erectly provided at the center of the second housing 2. The space 16 which has a ring-like form as viewed from the top is defined by the bottom and the cylindrical portion 6 of the first housing 1 and the upper surface and the inner cylindrical portion 15 of the second housing 2. The first mark 11 which can be seen from the upper side is provided on the outer cylindrical portion 6 of the first housing 1, and the through hole 23 and the transparent material 24 for filling up the through hole 23 are provided on the second housing 2 made of an opaque resin. The other portions such as the flexible cable 3, the moving member 4 and so on are the same as those in the above embodiments. In the alignment mechanism, when the second housing in the neutral state, since the first mark 11 coincides with the through hole 23, the third mark 22 on the spacer 20 can be visually observed from the outside through the transparent material 24 in the through hole 23. In states other than the neutral state, when the first mark 11 coincides with the through hole 23, the third mark 22 cannot be visually observed because it is deviated from the through hole 23.

In the fifth embodiment, the second housing 2 may be made of a transparent resin. In this case, the same indicator as the second mark 14 may be formed on the second housing 2 by printing or bonding in place of the provision of the through hole 23 and the transparent material 24. In addition, the same as the through hole 23 and the transparent material 24 may be provided on the first housing and the outer cylindrical portion 6 in place of the second housing 2 so that the third mark 22 on the spacer 20 is visually observed from the side of the first housing 1. In this case, if the movable range of the spacer 20 is set to less than one turn in the normal and reverse directions, the second mark on the second housing need not to be provided.

Although, in each of the embodiments, a flat cable is exemplified as the flexible cable 3, a round cable having conductor wires coated with an insulating tube can be used as the flexible cable 3. In this case, a plurality of round cables may be integrated into a band shape in accordance with the number of the circuits required.

As described above, the present invention can significantly decrease the necessary length of the flexible cable and simplify the mechanism for aligning the fixed member and the movable member with the neutral state, thereby providing an inexpensive clock spring connector useful for decreasing the size thereof.

What is claimed is:

1. A clock spring connector comprising:
   a fixed member;
   a movable member rotatably mounted to said fixed member;
   a flexible cable having one end connected to the fixed member and a second end connected to the movable member, said flexible cable contained in a space between an inner cylindrical portion provided on either of said fixed member and the movable member and an outer cylindrical portion provided on the other; and
   a moving member disposed in said space and having an opening;
   wherein said flexible cable is reversed within said opening of said moving member and is wound on said outer cylindrical portion and said inner cylindrical portion in opposite directions, an indicator portion is provided on said moving member, and means for visually observing the indicator portion are formed on one of the fixed member and the movable member so that said indicator portion can be visually observed from the outside when said movable member is in a neutral position of rotation.

2. A clock spring connector according to claim 1, wherein said indicator is provided at least one of said fixed member and said movable member.

3. A clock spring connector according to claim 1, wherein a member opposite to said indicator portion of said moving member is molded by a transparent resin, said indicator being provided on the molded member.

4. A clock spring connector according to claim 1, wherein a member opposite to said indicator portion of said moving member is molded by an opaque resin, a window through which said indicator portion can be visually observed being provided on the molded member.

5. A clock spring connector according to claim 1, wherein said indicator is provided on both said fixed member and said movable member, and a mark indicating the direction of rotation and the number of revolutions of said movable member from the neutral position is provided on one of said fixed member and said movable member so that the direction of rotation and the number of revolutions of said movable member can be known from the coincidence of said indicator portion of said moving member with said mark when the indicator of one of said fixed member and said movable member is aligned with the indicator of the other member indicating the neutral position of rotation of said movable member.

6. A clock spring connector according to claim 5, wherein said mark indicating the number of revolutions comprises a numeral.

7. A clock spring connector according to claim 2, wherein a member opposite to said indicator portion of said moving member is molded by a transparent resin, said indicator being provided on the molded member.

8. A clock spring connector according to claim 2, wherein a member opposite to said indicator portion of said moving member is molded by an opaque resin, a window through which said indicator portion can be visually observed being provided on the molded member.

9. A clock spring connector comprising:
a fixed member;
a movable member rotatably mounted to the fixed member, the fixed member and movable member cooperatively defining an annular space;
a flexible cable contained in the annular space, the flexible cable having one end connected to the fixed member and a second end connected to the movable member;
an annular moving member movably contained in the annular space, the annular moving member having a first indicator mark, the moving member including an opening for receiving a turned-back portion of the cable such that the cable is wound in a first direction on a first side of the moving member, and in an opposite direction on a second side of the moving member; and
means, formed on the fixed and movable members and cooperating with the first indicator mark, for indicating when the clock spring connector is in a rotationally neutral position.

10. A clock spring connector of claim 9 further comprising a second indicator mark located on an upper surface of the fixed member;
wherein the movable member includes a transparent upper plate;
wherein the first indicator mark on the moving member is visible through the transparent upper plate; and
wherein the rotationally neutral position is indicated by radial alignment of the first indicator mark and the second indicator mark.

11. A clock spring connector of claim 9 further comprising a second indicator mark located on an upper surface of the fixed member;
wherein the movable member includes an opaque upper plate including a through-hole;
wherein the rotationally neutral position is indicated by radial alignment of the first indicator mark, the through-hole and the second indicator mark.

12. A clock spring connector of claim 9,
wherein the fixed member includes an upper plate defining a groove;
wherein the movable member includes an opaque upper plate including a through-hole; and
wherein the rotationally neutral position is indicated by radial alignment of the first indicator mark and the through-hole such that they are visible through the groove.

13. A clock spring connector of claim 9,
wherein the movable member includes an outer cylindrical portion upon which is formed a protrusion;
wherein the fixed member includes an opaque upper plate including a through-hole; and
wherein the rotationally neutral position is indicated by radial alignment of the first indicator mark, the through-hole and the protrusion.

* * * * *